US008863800B2

(12) United States Patent
Sasaki

(10) Patent No.: US 8,863,800 B2
(45) Date of Patent: Oct. 21, 2014

(54) PNEUMATIC TIRE WITH SPECIFIED CARCASS FOLDED SECTION AND NOTCHED PORTION

(75) Inventor: Akira Sasaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/813,439

(22) PCT Filed: Aug. 4, 2011

(86) PCT No.: PCT/JP2011/004446
§ 371 (c)(1),
(2), (4) Date: Apr. 10, 2013

(87) PCT Pub. No.: WO2012/017673
PCT Pub. Date: Feb. 9, 2012

(65) Prior Publication Data
US 2013/0192738 A1 Aug. 1, 2013

(30) Foreign Application Priority Data

Aug. 5, 2010 (JP) ................................. 2010-176414

(51) Int. Cl.
*B60C 13/02* (2006.01)
*B60C 15/00* (2006.01)
*B60C 15/024* (2006.01)

(52) U.S. Cl.
CPC ......... *B60C 15/0009* (2013.04); *B60C 15/0063* (2013.04); *B60C 13/02* (2013.01); *B60C 15/00* (2013.01); *B60C 15/0036* (2013.04); *B60C 15/024* (2013.01)
USPC .............................. 152/523; 152/552; 152/554

(58) Field of Classification Search
CPC ............ B60C 15/0054; B60C 15/0063; B60C 15/0009; B60C 15/00; B60C 15/0036; B60C 15/0045; B60C 13/02

USPC ......................................... 152/552, 554, 523
See application file for complete search history.

(56) References Cited

U.S. PATENT DOCUMENTS 6,962,183 B2 * 11/2005 Ueyoko et al. ............ 152/552 X
7,077,182 B2 * 7/2006 Nagahara et al.
(Continued)

FOREIGN PATENT DOCUMENTS

EP 1 024 033 A2 8/2000
EP 1 925 468 A1 5/2008
(Continued)

OTHER PUBLICATIONS

Nov. 1, 2011 International Search Report issued in International Application No. PCT/JP2011/004446 (with translation).
(Continued)

*Primary Examiner* — Adrienne C Johnstone
(74) *Attorney, Agent, or Firm* — Oliff PLC

(57) ABSTRACT

A pneumatic tire includes a carcass having a first portion in which a distance between ply cords of a carcass body section and a carcass folded section gradually decreases from a position of a bead core toward outside in a radial direction of the tire, a second portion in which the distance between the ply cords gradually increases from the first portion toward outside in the radial direction of the tire, and a third portion in which the distance between the ply cords gradually decreases from the second portion toward outside in the radial direction of the tire. A notched portion is provided on a widthwise outer skin rubber of the carcass folded section of the second portion by notching the widthwise outer skin rubber inwardly in the width direction of the tire.

7 Claims, 4 Drawing Sheets

(56) References Cited

U.S. PATENT DOCUMENTS

| | | |
|---|---|---|
| 2009/0032161 A1 | 2/2009 | Yamaguchi |
| 2009/0236022 A1* | 9/2009 | Matsuda et al. |
| 2010/0252164 A1* | 10/2010 | Oogane |

FOREIGN PATENT DOCUMENTS

| | | | |
|---|---|---|---|
| JP | 04218414 A | * | 8/1992 |
| JP | A-9-309303 | | 12/1997 |
| JP | 2000225816 A | * | 8/2000 |
| JP | A 2000-301916 | | 10/2000 |
| JP | 2004306823 A | * | 11/2004 |
| JP | 2006069290 A | * | 3/2006 |
| JP | 2006347467 A | * | 12/2006 |
| JP | A-2007-191090 | | 8/2007 |
| JP | A-2007-196781 | | 8/2007 |
| JP | A 2009-113715 | | 5/2009 |
| JP | 2010274862 A | * | 12/2010 |
| WO | WO 2007/032405 A1 | | 3/2007 |

OTHER PUBLICATIONS

Mar. 24, 2014 Supplementary Search Report issued in European Patent Application No. 11814308.

* cited by examiner

PNEUMATIC TIRE WITH SPECIFIED CARCASS FOLDED SECTION AND NOTCHED PORTION

TECHNICAL FIELD

The present invention relates to a pneumatic tire, particularly relates to a pneumatic tire for heavy duty vehicles such as trucks and buses.

RELATED ART

For example, as illustrated in FIG. 1, a conventional pneumatic tire includes a carcass 102 formed of a ply extending toroidally between a pair of bead cores 101. The carcass 102 of the pneumatic tire consists of a carcass body section 102a extending toroidally between the pair of bead cores 101 and a carcass folded section 102b extending from the carcass body section 102a and folded around the bead core 101. It should be noted that the distance between the carcass body section 102a and the carcass folded section 102b (the distance between the ply cords) in general gradually decreases from a position of the bead cores 101 toward outside in the radial direction of the tire.

In Patent Document 1, the techniques of optimizing the thickness and shape of the rubber between the carcass body section 102a and the carcass folded section 102b is disclosed. This technique can effectively prevent the occurrence of a breakage of the cord at the end of the carcass folded section and cracks from the end of the carcass folded section to effectively improve both of weight reduction and endurance improvement of the tire without using a bead reinforcing member.

However, the technique described in Patent Document 1 adopts a structure in which the distance between the carcass folded section 102b and the carcass body section 102a decreases in the vicinity of the bead core 101 and then gradually increases from a given position radially outwardly. Therefore, in order to sufficiently protect the end of the carcass folded section, it is necessary to increase the thickness of the outer skin rubber of the tire at the end of the carcass folded section. Thus, it is concerned that the technique described in Patent Document 1 may deteriorate the outer skin rubber due to an increase in heat generation and heat accumulation.

Patent Document 1: Japanese Patent Application Laid-Open Publication No. 2007-196781

SUMMARY OF THE INVENTION

The purpose of the present invention is to provide a pneumatic tire that has an optimized distance between the ply cords to solve the above-mentioned problems and is capable of preventing rubber deterioration caused by heat accumulation and heat generation due to an increase in the thickness of rubber.

The inventor of the present invention has realized that the above-mentioned problem can be solved by a pneumatic tire including a pair of bead cores and a carcass formed of a ply, the ply consisting of a carcass body section extending toroidally between the pair of bead cores and a carcass folded section extending from the carcass body section and folded around the bead cores, in which a distance between ply cords of the carcass body section and the carcass folded section gradually decreases from a position of the bead cores toward outside in the radial direction of the tire, then gradually increases, and then gradually decreases again. However, this technique deteriorates the rubber due to an increase in heat generation and heat accumulation caused by an inevitable increase in the thickness of the rubber at the portion containing the position where the distance between the ply cords changes from a gradual increase to a gradual decrease (in other words, the maximal position of the distance between the ply cords). Therefore, the inventor of the present invention has made extensive studies on a means for solving such a problem. As a result, it is found that the desired purpose can be effectively achieved by notching a widthwise outer skin rubber inwardly in the width direction of the tire to form a notched portion on the widthwise outer skin rubber situated widthwise outside of a region where the distance between ply cords of the carcass body section and the carcass folded portion gradually increases.

The present invention is intended to be based on the above findings. Its summary and construction are as follows. (1) A pneumatic tire comprising a pair of bead cores and a carcass formed of a ply, the ply consisting of a carcass body section extending toroidally between the pair of bead cores and a carcass folded section extending from the carcass body section and folded around the bead cores, wherein the carcass comprises a first portion in which a distance between ply cords of the carcass body section and the carcass folded section gradually decreases from a position of the bead cores toward outside in a radial direction of the tire, a second portion in which the distance between the ply cords gradually increases from the first portion toward outside in the radial direction of the tire, and a third portion in which the distance between the ply cords gradually decreases from the second portion toward outside in the radial direction of the tire, and wherein a notched portion is provided on a widthwise outer skin rubber of the carcass folded section of the second portion by notching the widthwise outer skin rubber inwardly in the width direction of the tire.

(2) The pneumatic tire according to item (1), wherein, when the tire is mounted to an applicable rim, the following relationships are satisfied:

$$1.26 * H_f \leq H_A \leq 2.14 * H_f$$

$$2.43 * H_f \leq H_B \leq 3.75 * H_f$$

where $H_A$ is a distance from a rim diameter line of the applicable rim to a boundary position between the first portion and the second portion; $H_B$ is a distance from the rim diameter line of the applicable rim to a boundary position between the second portion and the third portion; and $H_f$ is a height of a flange of the applicable rim.

(3) The pneumatic tire according to item (1) or (2), wherein the following relationship is satisfied:

$$1.40 \leq b/a \leq 4.00$$

where a is the distance between the ply cords at a boundary position between the first and the second portions, and b is the distance between the ply cords at a boundary position between the second and the third portions.

(4) The pneumatic tire according to any one of items (1) to (3), wherein a minimum thickness of the widthwise outer skin rubber portion of the carcass folded section of the second portion is larger than a minimum thickness of the widthwise outer skin rubber portion of the carcass folded section of the third portion.

(5) The pneumatic tire according to any one of items (1) to (4), wherein the notched portion has a triangular sectional shape in the width direction of the tire.

(6) The pneumatic tire according to any one of items (1) to (4), wherein the notched portion has a trapezoidal sectional shape in the width direction of the tire.

(7) The pneumatic tire according to any one of items (1) to (4), wherein the notched portion has a circular arc sectional shape with a curvature radius of 1 or more in the width direction of the tire.

According to the present invention, the pneumatic tire has the optimized distance between the ply cords of the carcass body section and the carcass folded section from the position of the bead core toward outside in the radial direction of the tire, and the notched portion formed on the widthwise outer skin rubber of the carcass folded section of the second portion in which the distance between the cords gradually increases by notching the widthwise outer skin rubber inwardly in the width direction of the tire. As a result, the rubber deterioration caused by heat generation or heat accumulation due to an increase in the thickness of rubber can be prevented without sacrificing other performances such as cutting resistance performance (cutting tolerance).

BRIEF DESCRIPTION OF DRAWINGS

FIG. 3 (b) is a side view of a pneumatic tire according to the present invention.

FIG. 4 (b) is an enlarged cross-sectional view of a vicinity of the bead portion of a pneumatic tire according to the present invention in the width direction of the tire where the notched portion has a trapezoidal shape.

DESCRIPTION OF EMBODIMENTS

Figure 1:
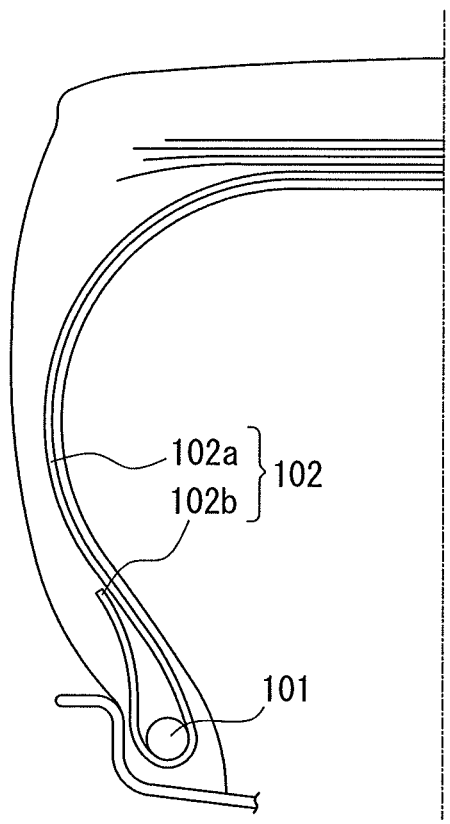
FIG. 1 is a schematic cross-sectional view of a half portion of a pneumatic tire according to the conventional example in the width direction of the tire.
Figure 2:
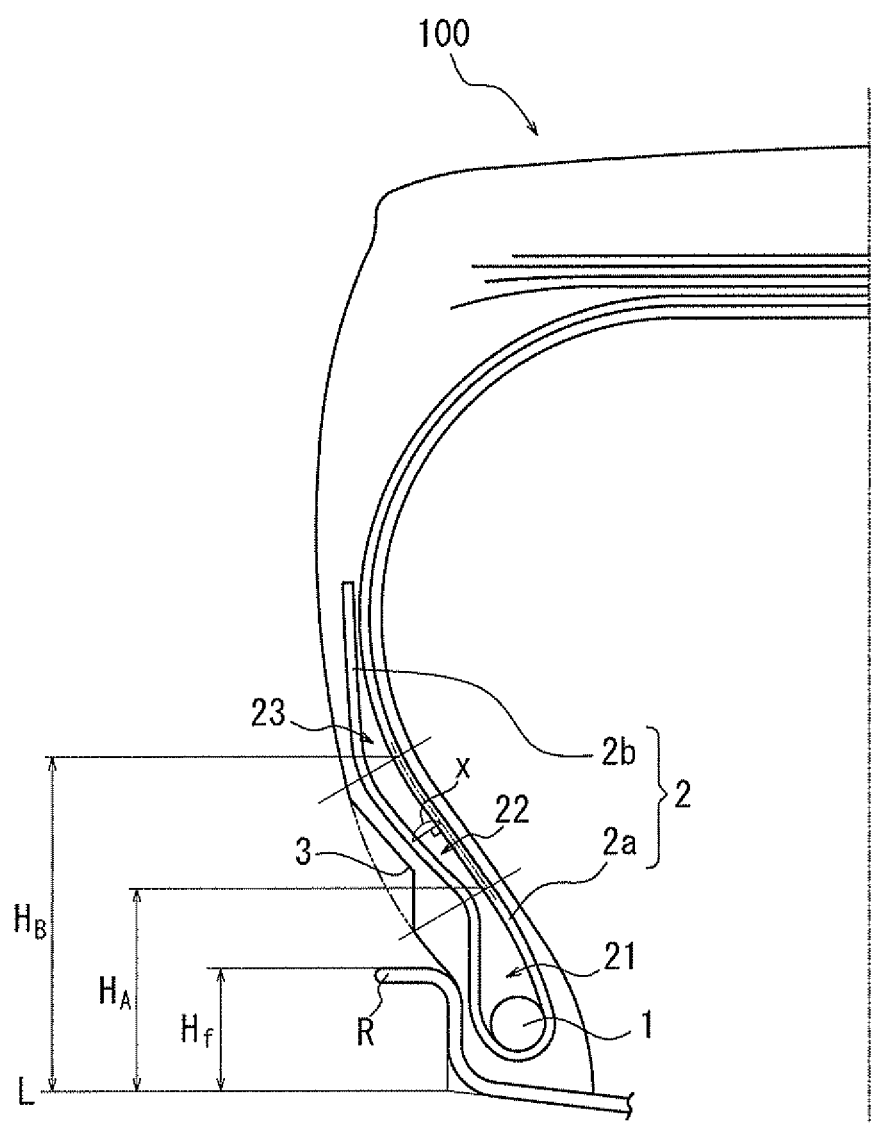
FIG. 2 is a schematic cross-sectional view of a half portion of a pneumatic tire according to the present invention in the width direction of the tire.

Embodiments of a pneumatic tire of the present invention are described below with reference to the figures. FIG. 2 illustrates one embodiment of a pneumatic tire according to the present invention schematically showing a cross section of a half portion of the tire in the width direction. A pneumatic tire 100 illustrated in FIG. 2 includes a pair of bead cores 1 (only one side is shown) and a carcass 2 formed of a ply, and the ply consists of a carcass body section 2a extending toroidally between the pair of bead cores 1 and a pair of carcass folded sections 2b each extending from the carcass body section 2a and folded axially outwardly around the respective bead core 1. Each carcass folded section 2b has a widthwise outer skin rubber. The carcass 2 radially above each bead core 1 consists of a first portion 21 in which a distance between ply cords of the carcass body section 2a and the carcass folded section 2b gradually decreases from a position of the bead cores 1 (an outermost position of the bead cores 1 in the radial direction of the tire) toward outside in the radial direction of the tire, a second portion 22 in which the distance between the ply cords gradually increases from the first portion 21 toward outside in the radial direction of the tire, and a third portion 23 in which the distance between the ply cords gradually decreases from the second portion 22 toward outside in the radial direction of the tire. In addition, a notched portion 3 is provided on the widthwise outer skin rubber of the carcass folded section 2b of the second portion 22 by notching the widthwise outer skin rubber inwardly in the width direction of the tire. With these constitutions, the pneumatic tire 100 exerts a significant effect that the rubber deterioration caused by heat generation or heat accumulation due to an increase in the thickness of rubber can be prevented without sacrificing other performance such as cutting resistance performance.

The term "the distance between the ply cords (or the distance between the cords)" as used herein refers to the distance between two intersection points where a straight line perpendicular to the carcass body section intersects the carcass body section cord and where the straight line intersects the carcass folded section cord, as shown as a reference symbol x in FIG. 2.

The pneumatic tire 100 has the minimal distance between the cords at a boundary position between the first portion 21 and the second portion 22 of the carcass 2. The closer the carcass folded section 2b is disposed to the carcass body section 2a (the shorter the distance between the cords becomes), the closer the carcass folded section 2b is disposed to the neutral axis of bending. Therefore, in the region where the carcass folded section 2b is disposed closely to the carcass body section 2a, the compressive strain of the carcass folded section 2b can be suppressed, thus the fatigue fracture of the carcass folded portions 2b can be suppressed.

In addition, the pneumatic tire 100 has the notched portion 3 on the widthwise outer skin rubber of the carcass folded section 2b of the second portion 22 of the carcass 2 by notching the widthwise outer skin rubber inwardly in the width direction of the tire. The provision of the notched portion 3 decreases the distance between the carcass folded section 2b and the outside surface skin of the tire. Here, the first portion 21 of the carcass 2, in other words, the portion that is closer to the bead cores 1 than the second portion 22, contacts the rim flange when the bead portion collapses toward outside in the width direction of the tire during rolling under load. Therefore, if the notched portion 3 is provided at the first portion 21, a displacement of the rim will be induced. On the other hand, if the notched portion 3 is disposed at the third portion 23 of the carcass 2, in other words, the portion that is radially outside of the second portion 22, the thickness of the rubber near the sidewall unnecessarily decreases, which significantly degrades the cutting resistance performance. Therefore, in the pneumatic tire 100, the notched portion 3 is provided on the widthwise outer skin rubber of the carcass folded section 2b of the second portion 22 of the carcass 2 by notching the widthwise outer skin rubber inwardly in the width direction of the tire. The notched portion 3 exists exclusively on the widthwise outer skin rubber of the carcass folded section 2b of the second portion 22 of the carcass 2, and no notched portion exists on the widthwise outer skin rubber of the carcass folded section 2b of any of the first portion 21 of the carcass 2 and the third portion 23 of the carcass 2. The notched portion 3 thus provided in the pneumatic tire 100 can prevent rubber deterioration caused by heat generation and heat accumulation due to the increase of the thickness of this portion without causing above-mentioned problems.

Figure 3:
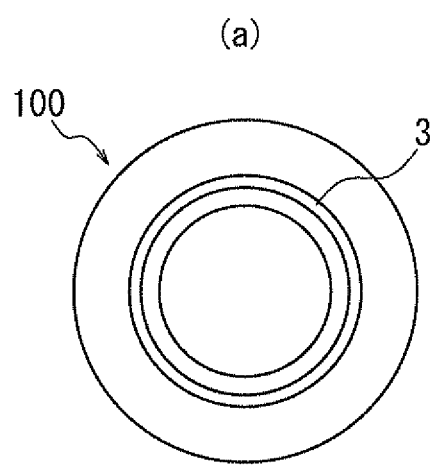
FIG. 3 (a) is a side view of a pneumatic tire according to the present invention.
Figure 3:
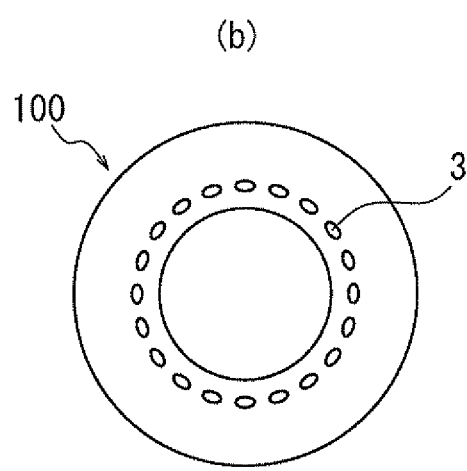

The notched portion may be provided continuously in the circumferential direction of the tire as shown in FIG. 3 (a), or intermittently in the circumferential direction of the tire as shown in FIG. 3 (b). It should be noted that in the pneumatic tire of the present invention, the more the outer skin rubber is notched, the more efficiently heat generation of the rubber and the risk of cracks at the notched portion can be reduced, so that the notched portion is preferably provided continuously in the circumferential direction of the tire as shown in FIG. 3(a).

In the pneumatic tire 100, as illustrated in FIG. 2, when the tire 100 is mounted to an applicable rim, the following relationships are preferably satisfied:

$$1.26*H_f \leq H_A \leq 2.14*H_f$$

$$2.43*H_f \leq H_B \leq 3.75*H_f$$

where $H_A$ is a distance from a rim diameter line L of the applicable rim R to a boundary position between the first portion 21 and the second portion 22; $H_B$ is a distance from the rim diameter line L of the applicable rim R to a boundary position between the second portion 22 and the third portion 23; and $H_f$ is a height of a flange of the applicable rim R.

The term "applicable rim" as used herein refers to valid industry standards in the regions where the tire is produced or used. In Japan, it refers to the rims defined by JATMA (The Japan Automobile Tyre Manufacturers Association) Year Book; in Europe, it refers to ETRTO (European Tyre and Rim Technical Orgnaisation) STANDARD MANUAL; and in the U.S., it refers to TRA (The Tire and Rim Association Inc.) Year Book. In addition, the term "rim diameter line" as used herein refers to the line extending along the width direction of the tire and passing through the position for measuring the rim diameter. Furthermore, the term "distance from a rim diameter line of the applicable rim to a boundary position between the first portion and the second portion" as used herein refers to the minimum distance, as illustrated as the reference symbol $H_A$ in FIG. 2, between a straight line passing the rim diameter line of the applicable rim and a straight line extending parallel to the rim diameter line and passing through a point where a straight line passing through the boundary position between the first portion and the second portion (the position having the minimal distance between the cords) intersects the cords of the body section of the carcass. In the same manner, the term "distance from the rim diameter line of the applicable rim to a boundary position between the second portion and the third portion" as used herein refers to the minimum distance, as illustrated as the reference symbol $H_B$ in FIG. 2, between a straight line passing the rim diameter line of the applicable rim and a straight line extending parallel to the rim diameter line and passing through a point where a straight line passing through the boundary position between the second portion and the third portion (the position having the maximal distance between the cords) intersects the cords of the body section of the carcass. It should be noted that, each distance, $H_A$, $H_B$ and $H_f$, refers to the distance under no-load state when the tire is mounted on the applicable rim and a predetermined inner pressure is applied. In addition, the term "predetermined pressure" as used herein refers to the inner pressure (maximum pneumatic pressure) corresponding to the maximum load capacity of the tire with applicable size of the tire specified in the standard such as JATMA.

When the above-mentioned distance $H_A$ is less than 1.26 $H_f$, the extent of the decrease becomes extremely large on the distance between the ply cords of the carcass body portion 2a and the carcass folded section 2b d from the position of the bead cores 1 toward outside in the radial direction of the tire, which leads to sudden change of the curvature ratio. Thereby, the manufacturing of the tire may become more difficult. In the mean time, the bending rigidity of the bead portion near the lower end of the rim flange decreases, the shear strain imposed on the carcass folded section 2b and the carcass body portion 2a may increase significantly due to the amount of the collapse increases at the bead portion during the above-mentioned rolling under load. Furthermore, since it also causes separation of the rubber along the carcass folded section 2b, the life of the tire may be reduced.

On the other hand, when the above-mentioned distance $H_A$ is 2.14*$H_f$ or more, the position having the minimal distance between the cords is moved excessively toward outside in the radial direction of the tire with respect to the region where the compressive strain is applied to the carcass folded section 2b to increase the compressive strain (at the side of the bead cores 1) toward inside in the radial direction of the tire. Furthermore, since the carcass folded section 2b near the rim flange is in a projection shape in the direction opposite to the carcass body section 2a, the shear strain imposed on the rubber between the outside surface of the bead portion and the carcass folded section 2b increases. As a result, it is difficult to suppress the occurrence of the separation between the carcass folded section 2b and the rubber.

Therefore, the pneumatic tire 100 according to the present invention is preferred to satisfy the following relationship between $H_A$ and $H_f$:

$$1.26*H_f \leq H_A \leq 2.14*H_f$$

In addition, when the above-mentioned distance $H_B$ is less than 2.43*$H_f$, the compressive strain imposed on the carcass folded section 2b increases at a position having the maximal distance between the cords, and the effect of reducing the compression strain by generating a tensile strain on the carcass folded portion 2b is reduced. As a result, it is difficult to suppress the fatigue fracture of the carcass folded section 2b.

On the other hand, when the above-mentioned distance $H_B$ is more than 3.75*$H_f$, the position having the maximal distance between the cords moves too far away with respect to the region where the compressive force is applied. As a result, the effect of reducing the compression strain by generating a tensile strain on the carcass folded portion 2b is reduced, so that it is difficult to suppress the fatigue fracture of the carcass the folded section 2b. In addition, the tension applied to the carcass folded section 2b increases in the region of the side wall near the end of the carcass folded section 2b. Therefore, the tension increases the shear strain of the rubber near the end portion of the carcass folded section 2b, and cracks are likely to occur at the end of the carcass folded section 2b.

Therefore, the pneumatic tire 100 according to the present invention is preferred to satisfy the following relationship between $H_B$ and $H_f$:

$$2.43*H_f \leq H_B \leq 3.75*H_f$$

The pneumatic tire 100 is also preferred to satisfy the following relationship between a and b in order to prevent the separation caused by the increase of heat generation or heat accumulation particularly at the boundary position between the second portion 22 and the third portion 23 due to an increase in the thickness of entire bead portion:

$$1.40 \leq b/a \leq 4.00$$

where a is the distance between the ply cords at a boundary position between the first portion 21 and the second portion 22, and b is the distance between the ply cords at a boundary position between the second portion 22 and the third portion 23.

It should be noted that, if the above-mentioned b/a is 1.00 or less, in the region where the tensile deformation occurs, the effect of sufficiently reducing the compression strain is lost due to no increase on the tensile force. As a result, the fatigue fracture of the carcass folded section 2b cannot be suppressed.

In addition, in order to ensure the performance of the cut resistance, the minimum thickness of the widthwise outer skin rubber portion of the carcass folded section 2b of the second portion 22 is preferred to be larger than the minimum thickness of the widthwise outer skin rubber portion of the carcass folded section 2b of the third portion 23. The minimum thickness of the widthwise outer skin rubber portion of the carcass folded section 2b of the second portion 22 and the minimum thickness of the widthwise outer skin rubber portion of the carcass folded section 2b of the third portion 23 are measured along a straight line perpendicular to the carcass body section 2a from the carcass folded section cord to the widthwise outer surface of the tire.

In addition, in the pneumatic tire 100, the cross-sectional shape of the notched portion 3 in the width direction of the tire is preferred to be triangular. In this case, in order to prevent the occurrence of cracks due to deterioration at the corner portion, the corner portion is more preferably formed with a curvature. In addition, as illustrated as one embodiment in FIG. 4 (a), the cross-sectional shape of the notched portion 3 in the width direction of the tire is more preferred to be a continuous circular arc shape with a curvature radius of 1 or more. When the cross-sectional shape of the notched portion 3 is in circular arc shape, the occurrence of cracks caused by the corner can be prevented. Furthermore, when a plurality of circular arcs are combined, the flexibility of the cross-sectional shape increases to enable an effective reduction of the amount of rubber.

Figure 4:
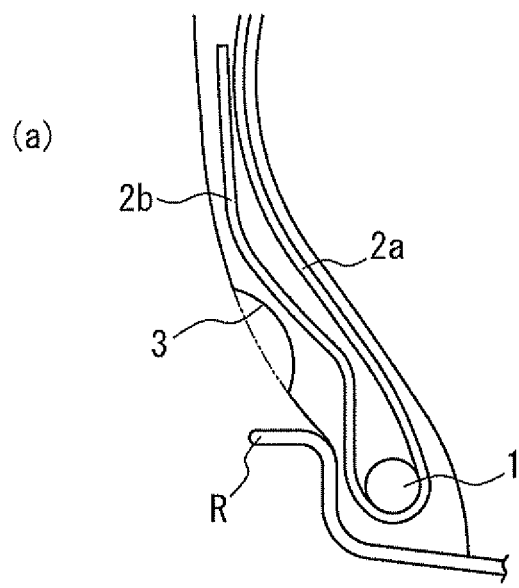
FIG. 4 (a) is an enlarged cross-sectional view of a vicinity of the bead portion of a pneumatic tire according to the present invention in the width direction of the tire where the notched portion has a circular-arc-shaped with a curvature radius of 1 or more.
Figure 4:
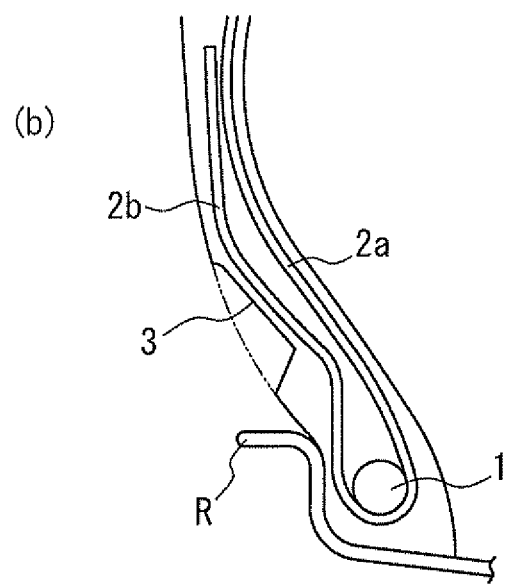

Alternatively, the cross-sectional shape of the notched portion 3 in the width direction of the tire may be quadrangle shape, or more specifically trapezoidal shape as illustrated as one of the embodiments of FIG. 4 (b). In this case, although the number of the corner portions has been increased, the flexibility of the cross-sectional shape increases to enable an effective reduction of the amount of rubber.

In addition, the cross-sectional area of the notched portion 3 in the width direction of the tire is preferred to be in the range of 5-30% of the portion surrounded by the carcass folded section n and the outside surface of the tire. When the area is less than 5%, the reduction of the heat generation of the bead portion is not sufficiently exhibited. On the other hand, when the area is more than 30%, the collapse deformation of the bead portion increases and the distortion of the carcass folded section increases, thereby, the separation becomes more likely to occur. It should be noted that the term "the portion surrounded by the carcass folded section and the outside surface of the tire" as used herein refers to the portion surrounded by the carcass folded section and the outer surface of the tire (illustrated by a two-dot chain line in FIG. 2 at the outer surface of the conventional tire) formed by a smooth curve without forming a notched portion. In addition, when the distance along the radial direction of the tire from the rim diameter line to the outer end of the carcass folded section in radial direction of the tire is 0.3 times or more of the cross-sectional height SH, the term "the portion surrounded by the carcass folded section and the outside surface of the tire" as used herein refers to that the distance along the radial direction of the tire from the rim diameter line is within the range of 1.15 times and more of the applicable rim flange height $H_f$, and 0.3 times less of the cross-sectional height SH.

The pneumatic tire 100 is more effective when utilized on heavy duty vehicles such as heavy load trucks or buses. It should be noted that, the above-mentioned embodiments are by way of example, and the present invention is not limited to these embodiments.

EXAMPLES

Example 1

A pneumatic tire having the tire size of 59/80R63 and the structure shown in FIG. 2 has been prepared. The pneumatic tire thus prepared includes a pair of bead cores and a carcass formed of a ply, the ply consists of a carcass body section extending toroidally between the pair of bead cores and a carcass folded section extending from the carcass body section and folded around the bead cores. The carcass includes a first portion in which a distance between ply cords of the carcass body section and the carcass folded section gradually decreases from a position of the bead cores toward outside in a radial direction of the tire, a second portion in which the distance between the ply cords gradually increases from the first portion toward outside in a radial direction of the tire, and a third portion in which the distance between the ply cords gradually decreases from the second portion toward outside in a radial direction of the tire. Furthermore, a notched portion is provided on a widthwise outer skin rubber of the carcass folded section of the second portion by notching the widthwise outer skin rubber inwardly in the width direction of the tire. When the prepared tire is mounted on the applicable rim (width: 1117.6 mm, flange height $H_f$: 127 mm, inner pressure: 600 kPa), the distance $H_A$ from the rim diameter line of the applicable rim to the boundary position between the first and the second portions is 1.60*$H_f$. The distance $H_B$ from the rim diameter line of the applicable rim to the boundary position between the second and the third portions is 3.06*$H_f$. In addition, the b/a ratio is 2.95 (b/a=2.95), where a is the distance between the cords at a boundary position between the first and the second portions, and b is the distance between the cords at a boundary position between the second and the third portions. In addition, the cross-sectional shape of the notched portion in the width direction of the tire is triangular shape, and the notched portion is disposed continuously in the circumferential direction of the tire. The cross-sectional area of the notched portion in the width direction of the tire is set to be 20% of the area of the portion surrounded by the carcass folded section and the outside surface of the tire. In addition, the minimum thickness of the widthwise outer skin rubber portion of the carcass folded section of the second portion is set to be larger than the minimum thickness of the widthwise outer skin rubber portion of the carcass folded section of the third portion.

Example 2

A pneumatic tire is prepared in the same manner as in Example 1 except that the cross-sectional shape of the notched portion in the width direction of the tire is set to be trapezoidal shape.

Example 3

A pneumatic tire is prepared in the same manner as in Example 1 except that the notched portion is set in a circular arc sectional shape with a curvature radius of 1 or more in the width direction of the tire.

Example 4

A pneumatic tire is prepared in the same manner as in Example 1 except that a curvature is disposed at the corner portion of the triangular-shaped notched portion.

Example 5

A pneumatic tire is prepared in the same manner as in Example 1 except that the distance $H_A$ from a rim flange of the applicable rim to a boundary position between the first and the second portions is set as $1.25*H_f$.

Example 6

A pneumatic tire is prepared in the same manner as in Example 1 except that the distance $H_A$ from a rim flange of the applicable rim to a boundary position between the first and the second portions is set as $2.15*H_f$.

Example 7

A pneumatic tire is prepared in the same manner as in Example 1 except that the distance $H_B$ from a rim flange of the applicable rim to a boundary position between the second and the third portions is set as $2.42*H_f$.

Example 8

A pneumatic tire is prepared in the same manner as in Example 1 except that the distance $H_B$ from a rim flange of the applicable rim to a boundary position between the second and the third portions is set as $3.76*H_f$.

Example 9

A pneumatic tire is prepared in the same manner as in Example 1 except that the b/a ratio is set as 1.39 (b/a=1.39), where a is the distance between the cords at a boundary position between the first and the second portions, and b is the distance between the cords at a boundary position between the second and the third portions.

Example 10

A pneumatic tire is prepared in the same manner as in Example 1 except that the b/a ratio is set as 4.01 (b/a=4.01), where a is the distance between the cords at the boundary position between the first and the second portions, and b is the distance between the cords at the boundary position between the second and the third portions.

Example 11

A pneumatic tire is prepared in the same manner as in Example 1 except that the notched portion is disposed intermittently in the circumferential direction of the tire.

Example 12

A pneumatic tire is prepared in the same manner as in Example 1 except that the cross-sectional area of the notched portion in the width direction of the tire is set to be 3% of the portion surrounded by the carcass folded section and the outside surface of the tire.

Example 13

A pneumatic tire is prepared in the same manner as in Example 1 except that the cross-sectional area of the notched portion in the width direction of the tire is set to be 33% of the portion surrounded by the carcass folded section and the outside surface of the tire.

Example 14

A pneumatic tire is prepared in the same manner as in Example 1 except that the minimum thickness of the widthwise outer skin rubber portion of the carcass folded section of the second portion is set to be smaller than a minimum thickness of the widthwise outer skin rubber portion of the carcass folded section of the third portion.

Comparative Example 1

A pneumatic tire is prepared in the same manner as in Example 1 except that the notched portion is not provided and the b/a ratio is fixed as b/a=1.00, where a is the distance between the cords at the boundary position between the first and the second portions, and b is the distance between the cords at the boundary position between the second and the third portions.

Comparative Example 2

A pneumatic tire is prepared in the same manner as in Example 1 except that the notched portion is not provided.

Heat generation and endurance tests of the bead portion have been carried out to the above-mentioned examples 1 through 14 and comparative examples 1 and 2 in the following manner. The results of these tests are shown in Table 1 below.

(Heat Generation Test)

The heat generation of the bead portion is evaluated by measuring the temperature of the bead portion after a 24 hours drum running test which is conducted on a drum endurance tester with the drum diameter of 7m, under a condition that the tire is driven at 8 km/h on the drum, and a load of 100% of a standard load 996.4 kN is applied to the tire. In particular, small holes are provided at the positions having the minimal distances between the cords, and thermocouples are inserted into the small holes after the drum running test to measure the temperatures at three points on the circumference at 5 mm transverse to the carcass folded section. Then, the average values of the measured temperatures are determined and then the temperature differences (extents of the temperature reduction) with respect to the temperature of Comparative Example 1 are obtained.

(Endurance Test)

The endurance of the bead portion is evaluated with step-load method on a drum endurance tester with the drum diameter of 7 m, under a condition that the tire is driven at 8 km/h on the drum, and a load of 150 to 180% of a standard load 996.4 kN is applied to the tire. It should be noted that the step-load method refers to a method of applying the load to a pneumatic tire subjected to be measured for 12 hours, during which 150% of the standard load is applied at the beginning, subsequently, the load is increased with 10% of the standard load each time until it reaches 180% of the standard load. The results are respectively indicated by indices with the evaluation result (the sum of the product of the weight applied of each load and the drum running time under each applied load) of the Comparative Example 1 being set to 100 (the greater the index is, the better the performance is).

TABLE 1

|  |  | Ex 1 | Ex 2 | Ex 3 | Ex 4 | Ex 5 | Ex 6 | Ex 7 | Ex 8 |
|---|---|---|---|---|---|---|---|---|---|
| Notched Portion | Distance $H_A$ (*$H_f$) | 1.60 | 1.60 | 1.60 | 1.60 | 1.25 | 2.15 | 1.60 | 1.60 |
|  | Distance $H_B$ (*$H_f$) | 3.06 | 3.06 | 3.06 | 3.06 | 3.06 | 3.06 | 2.42 | 3.76 |
|  | b/a | 2.95 | 2.95 | 2.95 | 2.95 | 2.95 | 2.95 | 2.95 | 2.95 |
|  | Shape | Triangle | Trapezoid | Circular Arc | Triangle (*3) | Triangle | Triangle | Triangle | Triangle |
|  | Area Ratio (%) (*1) | 20 | 20 | 20 | 20 | 20 | 20 | 20 | 20 |
| Bead Portion | Temperature Reduced Range (° C.) | −2.0 | −2.0 | −2.0 | −2.0 | ±0 | −0.5 | −0.5 | ±0 |
|  | Bead Portion Endurance (Index) | 125 | 125 | 125 | 125 | 120 | 122 | 122 | 120 |

|  |  | Ex 9 | Ex 10 | Ex 11 | Ex 12 | Ex 13 | Ex 14 | Comp Ex 1 | Comp Ex 2 |
|---|---|---|---|---|---|---|---|---|---|
| Notched Portion | Distance $H_A$ (*$H_f$) | 1.60 | 1.60 | 1.60 | 1.60 | 1.60 | 1.60 | 1.60 | 1.60 |
|  | Distance $H_B$ (*$H_f$) | 3.06 | 3.06 | 3.06 | 3.06 | 3.06 | 3.06 | 3.06 | 3.06 |
|  | b/a | 1.39 | 4.01 | 2.95 | 2.95 | 2.95 | 2.95 | 100 (*2) | 2.95 |
|  | Shape | Triangle | Triangle | Triangle (*4) | Triangle | Triangle | Triangle | — | — |
|  | Area Ratio (%) (*1) | 20 | 20 | 20 | 3 | 33 | 20 | — | — |
| Bead Portion | Temperature Reduced Range (° C.) | −2.0 | −1.0 | −1.5 | ±0 | −2.5 | −2.0 | — | +0.5 |
|  | Bead Portion Endurance (Index) | 124 | 125 | 120 | 115 | 123 | 125 | 100 | 119 |

(*1) A ratio to the area surrounded by the carcass folded section and the outside surface of the tire
(*2) A fixed distance between the cords
(*3) A triangle having a curvature at the corner portion
(*4) A notched portion disposed intermittently As shown in Table 1, Examples 1 through 14 according to the present invention have larger extent of temperature reduction and better endurance at the bead portion as compared to Comparative Examples 1 and 2.

According to the present invention, a pneumatic tire has the optimized distance between the ply cords of the carcass body section and the carcass folded section from the position of the bead cores toward outside in the radial direction of the tire, and the notched portion formed on the widthwise outer skin rubber of the carcass folded section of the second portion in which the distance between the cords gradually increases by notching the widthwise outer skin rubber inwardly in the width direction of the tire. As a result, the rubber deterioration caused by heat generation or heat accumulation due to an increase in the thickness of rubber can be prevented without sacrificing other performances such as cutting resistance performance.

REFERENCE SYMBOLS

100 Pneumatic tire
1 Bead cores
2 Carcass
2a Carcass body portion
2b Carcass folded portion
3 Notched portion
21 The first portion
22 The second portion
23 The third portion

The invention claimed is:
1. A pneumatic tire comprising a pair of bead cores and a carcass formed of a ply, the ply consisting of a carcass body section extending toroidally between the pair of bead cores and a pair of carcass folded sections each extending from the carcass body section and folded axially outwardly around the respective bead core, each carcass folded section having a widthwise outer skin rubber,
wherein radially above each bead core the carcass comprises a first portion in which a distance between ply cords of the carcass body section and the carcass folded section gradually decreases from a position of the bead core toward outside in a radial direction of the tire, a second portion in which the distance between the ply cords gradually increases from the first portion toward outside in the radial direction of the tire, and a third portion in which the distance between the ply cords gradually decreases from the second portion toward outside in the radial direction of the tire,
and wherein a notched portion is provided on the widthwise outer skin rubber of the carcass folded section of the second portion by notching the widthwise outer skin rubber inwardly in the width direction of the tire, the notched portion existing exclusively on the widthwise outer skin rubber of the carcass folded section of the second portion and no notched portion existing on the widthwise outer skin rubber of the carcass folded section of any of the first portion and the third portion.

2. The pneumatic tire according to claim 1, wherein, when the tire is mounted to an applicable rim, the following relationships are satisfied:

$$1.26*H_f \leq H_A \leq 2.14*H_f$$

$$2.43*H_f \leq H_B \leq 3.75*H_f$$

where $H_A$ is a distance from a rim diameter line of the applicable rim to a boundary position between the first portion and the second portion; $H_B$ is a distance from the rim diameter line of the applicable rim to a boundary position between the second portion and the third portion; and $H_f$ is a height of a flange of the applicable rim.

3. The pneumatic tire according to claim 1, wherein the following relationship is satisfied:

$$1.40 \leq b/a \leq 4.00$$

where a is the distance between the ply cords at a boundary position between the first and the second portions, and b is the distance between the ply cords at a boundary position between the second and the third portions.

4. The pneumatic tire according to claim 1, wherein a minimum thickness of the widthwise outer skin rubber portion of the carcass folded section of the second portion is larger than a minimum thickness of the widthwise outer skin rubber portion of the carcass folded section of the third portion, wherein the minimum thickness of the widthwise outer skin rubber portions of the carcass folded section of the second portion and of the third portion are measured along a straight line perpendicular to the carcass body section 2a from the carcass folded section cord to the widthwise outer surface of the tire.

5. The pneumatic tire according to claim 1, wherein the notched portion has a triangular sectional shape in the width direction of the tire.

6. The pneumatic tire according to claim 1, wherein the notched portion has a trapezoidal sectional shape in the width direction of the tire.

7. The pneumatic tire according to claim 1, wherein the notched portion has a circular arc sectional shape with a curvature radius of 1 or more in the width direction of the tire.

* * * * *